April 30, 1929.  J. D. YOUNGMAN  1,711,004
DAIRY BARN STRUCTURE
Original Filed April 21, 1927   2 Sheets-Sheet 1
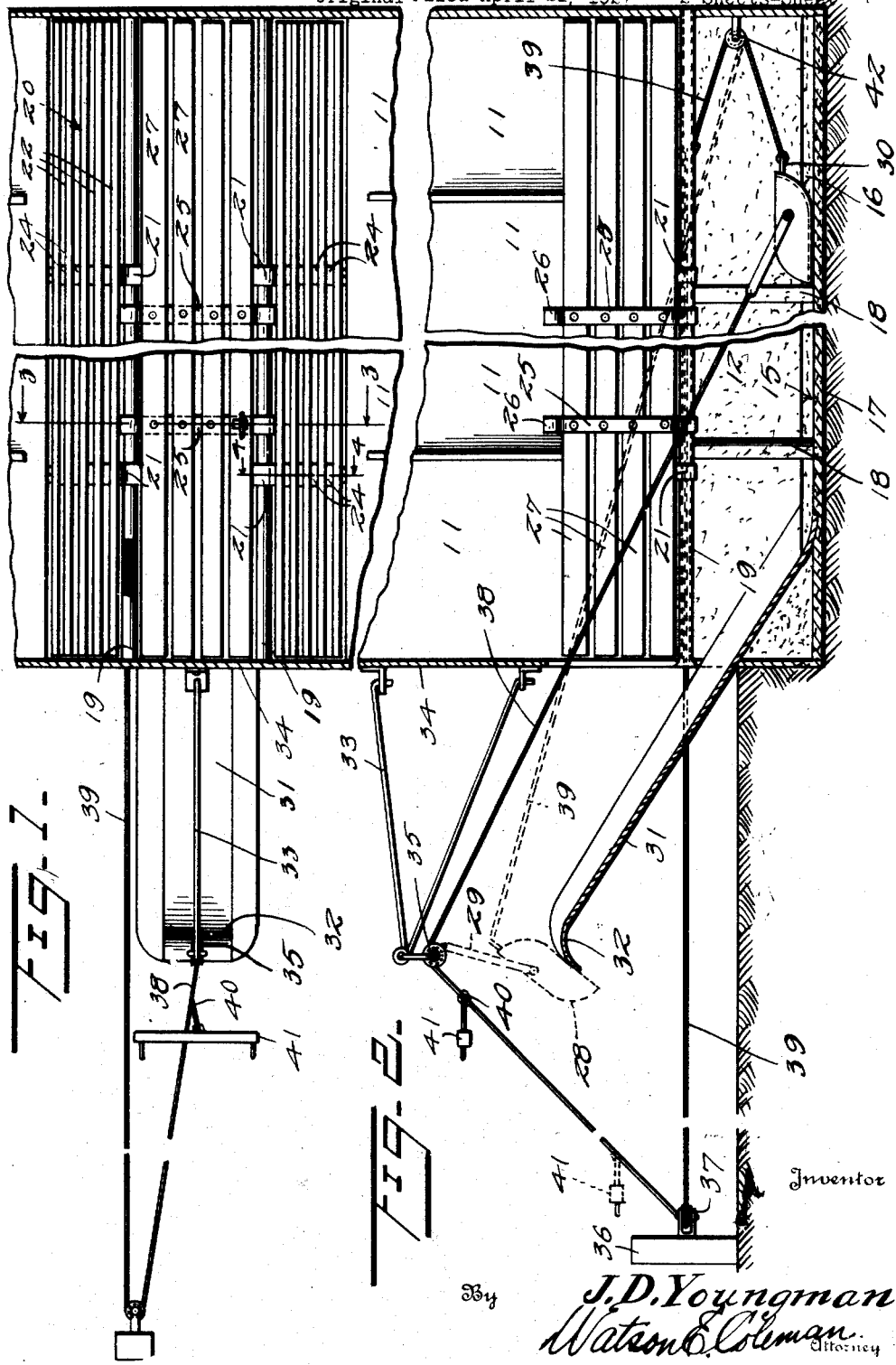
Inventor
J. D. Youngman
Watson E. Coleman
Attorney

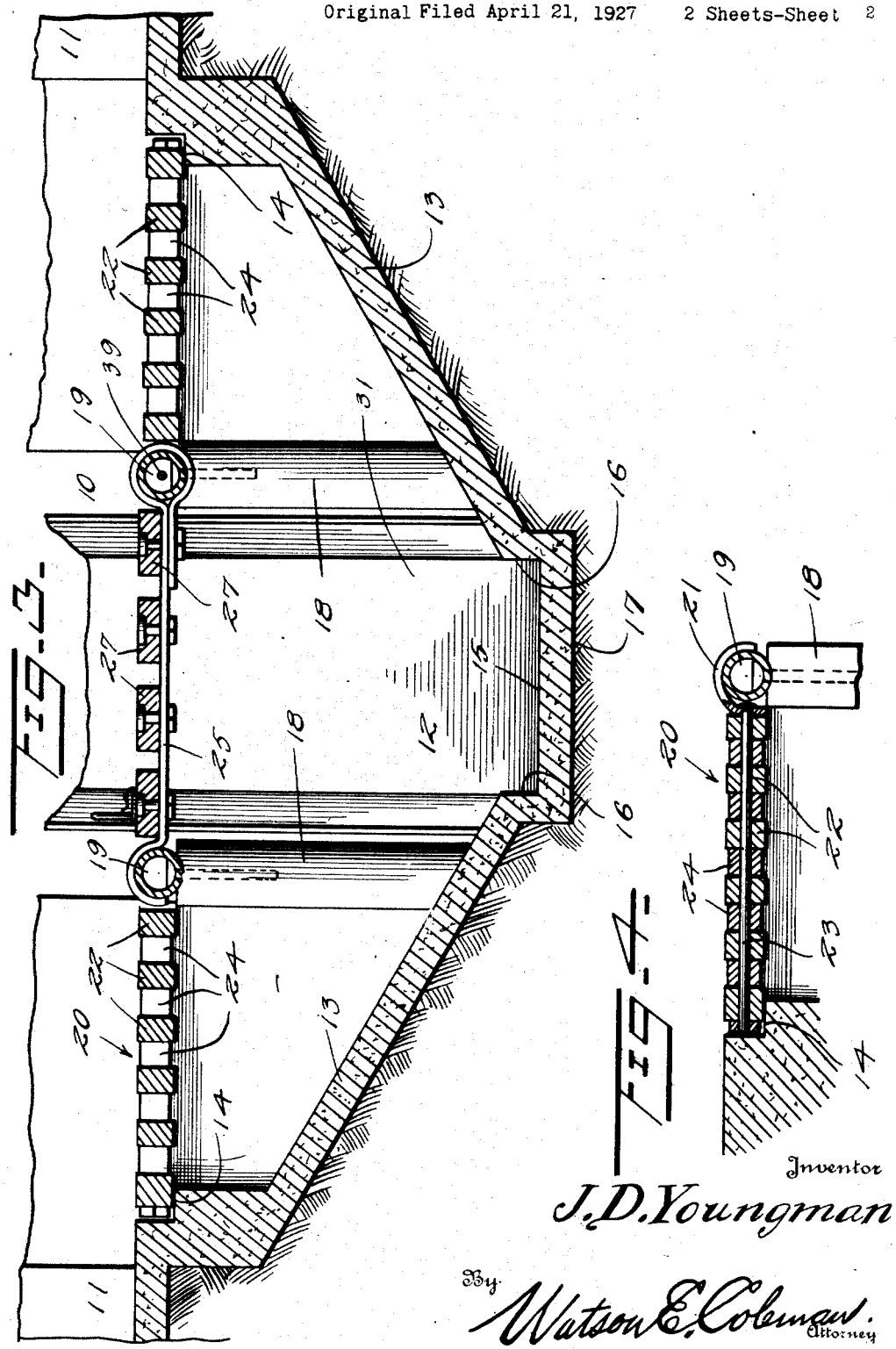

Patented Apr. 30, 1929.

1,711,004

UNITED STATES PATENT OFFICE.

JOHN D. YOUNGMAN, OF SLEEPY EYE, MINNESOTA.

DAIRY-BARN STRUCTURE.

Application filed April 21, 1927, Serial No. 185,611. Renewed October 27, 1928.

This invention relates to dairy barn structures and more particularly to a dairy barn structure facilitating the collection and removal of manure.

An important object of the invention is to provide a structure which will facilitate the work of keeping the barn in a clean sanitary condition and which provides means for collecting the manure in such a way that it may be very readily removed.

A further object of the invention is to provide a novel and improved means for removing the collected manure.

These and other objects I attain by the construction shown in the accompanying drawings, wherein for the purpose of illustration is shown a preferred embodiment of my invention and wherein:—

Figure 1 is a plan view of a portion of a barn structure constructed in accordance with my invention;

Figure 2 is a longitudinal sectional view therethrough;

Figure 3 is an enlarged transverse view therethrough on the line 3—3 of Figure 1;

Figure 4 is an enlarged sectional view on the line 4—4 of Figure 1.

Referring now more particularly to the drawings, the numeral 10 generally designates a passageway in the barn, at at least one side of which is arranged outwardly facing stalls 11. The floor of the passageway 10 along which the cattle must pass to reach the stalls overlies a pit 12 extending longitudinally of the passageway. In the present structure, the stalls 11 are shown as arranged at opposite sides of the passageway and the pit 12 as located centrally between adjacent ends of the stalls. The side walls 13 of the pit 12 incline from the edges of the stalls downwardly to the bottom of the pit, these walls being preferably shouldered immediately below the floor level, as indicated at 14, for a purpose presently to appear.

The side walls preferably converge upon a central channel 15 having relatively short vertically extending side walls 16 and having a bottom 17, which forms the actual bottom of the pit.

Extending upwardly from the side walls 13 at opposite sides of the channel and at spaced intervals are vertical supports 18 upon the upper ends of which are arranged longitudinally extending supporting beams 19 which are preferably circular in cross section and tubular. Each vertical support 18 has its upper surface flush with the shoulders 14 of the side walls and the grating 20 extends between each row of supports 18 and the adjacent shoulder 14 and rests upon each thereof. This grating has flat arcuately curved clips 21, which extend over the adjacent longitudinally extending support 19 to hold the grating in position. The gratings 20 preferably are formed of longitudinally extending strips 22, through which tie rods 23 are passed. Upon these tie rods intermediate the strips are secured spacers 24, which hold the strips spaced, so that manure may pass between adjacent strips into the pit. Nuts upon the ends of the tie rods provide a means for not only securing the strips in assembled relation, but likewise attaching thereto the clips 21.

Rotatably engaged with one of the longitudinally extending supports 19 are the ends of a plurality of transversely extending bars 25, the opposite ends of which are formed with arcuate bends 26 adapted to engage over the other of the longitudinally extending supports. To these strips, a flooring 27 is secured, adjacent members of which may be spaced from one another, if so desired, so that the cleansing of the floor may be facilitated. It will be obvious that droppings deposited either upon the floor or the gratings 20 will pass downwardly into the pit and along the sloping side walls 13 thereof into the channel 15 from which they may be collected.

As a convenient means for removing material collected within the channel 15, I arrange in this channel a scoop 28, the upper portion of the side walls of which rearwardly of the center, are pivoted the ends of the arms of a U-shaped bail 29. The rear wall of the scoop is provided at its upper edge with an eye 30. Adjacent one end of the barn structure, the channel 15 communicates with an inclined chute 31, the upper outer end of which is provided with a curved lip 32. An arm 33 preferably supported from the barn wall 34 has its end extended over this lip and provided with a guide sheave 35. At a point spaced from the end of the chute, a suitable support 36 is provided, this support having a guide sheave 37. A load cable 38 is connected to the bail 29, led over the sheave 35 and connected to the end of a second cable 39 by a connector 40, with which a single or double-tree 41 is rotatably connected, so that an animal secured thereto may be driven either directly toward or away from the chute 31. The second cable 39 passes about the sheave 37 through one of the tubular longitudinally extending supports to a point adjacent the opposite end of the channel 15, where it passes over a guide sheave 42 and is connected to the eye 30.

It will be obvious that when power is applied at the connection 40 to move this connection longitudinally of the chute and away from the end thereof, the scoop will be moved toward the chute and will eventually extend over the lip 32 sufficiently far to enable the scoop to dump its contents over this lip. As the scoop dumps, the bail will come into contact with the sheave 35 and provide a check for movement. The movement of the draft animal is then reversed and the connection 40 moved toward the end of the chute 32, with the result that the scoop will be returned to the far end of the channel for another collecting operation.

It will be obvious that the construction hereinbefore set forth is capable of a certain range of change and modification without materially departing from the spirit of the invention and I accordingly do not limit myself to such specific structure except as hereinafter claimed.

I claim:—

1. In a barn structure, a passageway, outwardly facing stalls arranged at opposite sides thereof, a longitudinally extending pit beneath the passageway the side walls of which converge toward the bottom, aligned rows of vertical supports extending upwardly from the pit walls at opposite sides of the center thereof, longitudinally extending supporting beams arranged upon the upper ends of each row of vertical supports, a grating extending between each longitudinal support and the upper end of the adjacent side wall of the pit, a plurality of transversely extending bars pivoted to one of said longitudinally extending supports and having means at their opposite end for engaging the other thereof and a flooring secured to said bars.

2. In a barn structure, a passageway, outwardly facing stalls arranged at opposite sides thereof, a longitudinally extending pit beneath the passageway the side walls of which converge toward the bottom, aligned rows of vertical supports extending upwardly from the pit walls at opposite sides of the center thereof, longitudinally extending supporting beams arranged upon the upper ends of each row of vertical supports, a grating extending between each longitudinal support and the upper end of the adjacent side wall of the pit, the walls of the pit having shoulders at their upper ends upon which the coacting edges of the gratings rest, said shoulders being spaced from the upper edges of the walls of the pit equal to the thickness of the gratings, a plurality of transversely extending bars pivoted to one of said longitudinally extending supports and having means at their opposite end for engaging the other thereof and a flooring secured to said bars.

3. In a barn structure, a passageway, outwardly facing stalls arranged at opposite sides thereof, a longitudinally extending pit beneath the passageway the side walls of which converge toward the bottom, aligned rows of vertical supports extending upwardly from the pit walls at opposite sides of the center thereof, longitudinally extending supporting beams arranged upon the upper ends of each row of vertical supports, a grating extending between each longitudinal support and the upper end of the adjacent side wall of the pit, a plurality of transversely extending bars pivoted to one of said longitudinally extending supports and having means at their opposite end for engaging the other thereof, a flooring secured to said bars, the bottom of the pit being in the form of a longitudinally extending channel, a member operable longitudinally of the channel for collecting manure therefrom, one of the longitudinally extending supporting beams being tubular and a return line for the connecting member extended through said support.

4. In a barn structure, a passageway, outwardly facing stalls arranged at at least one side thereof, a longitudinally extending pit beneath the passageway, the flooring of the passageway being in the form of a grating the sections of which are pivotally supported to permit access to the pit, the bottom of the pit being in the form of a channel, a bucket movable longitudinally of the channel to collect manure therefrom, and load and return lines connected with said bucket, said flooring being supported in part by longitudinally extending supports, the return line for the bucket being housed within one of said supports.

5. In a barn structure, a passageway, outwardly facing stalls arranged at at least one side thereof, a longitudinally extending pit beneath the passageway, the flooring of the passageway being in the form of a grating the sections of which are pivotally supported to permit access to the pit, the bottom of the pit being in the form of a channel, a bucket movable longitudinally of the channel to collect manure therefrom, load and return lines connected with the bucket, a chute communicating with one end of the channel and inclining upwardly and outwardly therefrom when moving under the influence of the load line passing along the chute to the upper end thereof and means for checking movement of the bucket with the upper end thereof extended over the end of the chute whereby the bucket is discharged.

6. A structure as claimed in claim 5, wherein the flooring is supported in part by longitudinally extending tubular supports and a return line for the bucket is housed in one of said supports.

7. In a barn structure, a passageway, outwardly facing stalls arranged at opposite sides thereof, a longitudinally extending pit beneath the passageway the side walls of which converge toward the bottom, aligned rows of vertical supports extending upwardly from the pit walls at opposite sides of the center thereof, longitudinally extending supporting beams arranged upon the upper ends of each row of vertical supports, a grating extending between each longitudinal support and the upper end of the adjacent side wall of the pit, and a central flooring supported at its edges from said longitudinally extending supports.

In testimony whereof I hereunto affix my signature.

JOHN D. YOUNGMAN.